United States Patent [19]

Prince

[11] Patent Number: 5,169,699
[45] Date of Patent: Dec. 8, 1992

[54] REINFORCING SUBSTRATE STRUCTURES WITH DECORATIVE SURFACE LAYER

[75] Inventor: Kendall W. Prince, Mesa, Ariz.

[73] Assignee: Avista Industries, Inc., Mesa, Ariz.

[21] Appl. No.: 526,299

[22] Filed: May 21, 1990

[51] Int. Cl.$^5$ .............................................. B32B 1/04
[52] U.S. Cl. .......................................... 428/68; 428/74;
428/232; 428/251; 428/284; 428/285; 428/294;
428/902
[58] Field of Search ............... 428/284, 285, 251, 902,
428/232, 294, 68, 74

[56] References Cited

U.S. PATENT DOCUMENTS

| | | | |
|---|---|---|---|
| 3,620,906 | 11/1971 | Hannes | 161/203 |
| 3,889,348 | 6/1975 | Lemelson | 428/294 |
| 3,936,550 | 2/1976 | Carlson et al. | 428/294 |
| 4,205,107 | 5/1980 | Jaschke | 428/58 |
| 4,303,716 | 12/1981 | Eshbach et al. | 428/294 |
| 4,353,947 | 10/1982 | Northcutt | 428/251 |
| 4,372,800 | 2/1983 | Oizumi | 156/307.3 |
| 4,379,553 | 4/1983 | Kelly | 273/51 |
| 4,419,400 | 12/1983 | Hindersinn | 428/245 |
| 4,451,528 | 5/1984 | Krause | 428/902 |
| 4,655,861 | 4/1987 | Kiss | 156/62.2 |
| 4,681,722 | 7/1987 | Carter | 264/171 |
| 4,746,560 | 5/1988 | Goeden | 428/151 |
| 4,752,513 | 6/1988 | Rau et al. | 428/294 |
| 4,789,604 | 12/1988 | van der Hoeven | 428/503 |
| 4,803,022 | 2/1989 | Barrell | 264/25 |
| 4,814,224 | 3/1989 | Geibel et al. | 428/294 |
| 4,818,590 | 4/1989 | Prince | 428/213 |
| 4,842,667 | 6/1989 | Thorsted | 156/166 |
| 4,913,955 | 4/1990 | Noda et al. | 428/902 |
| 4,938,823 | 7/1990 | Balazek et al. | 428/294 |

Primary Examiner—James J. Bell
Attorney, Agent, or Firm—LaValle D. Ptak

[57] ABSTRACT

An advanced composite or reinforcing substrate is produced with a decorative surface layer, made of a thin veneer of cloth, fabric, paper, wood, vinyl or other material, which is structurally, integrally bonded to the reinforcing substate by simultaneoulsy forming the decorative surface layer together with the substrate to partially or totally encapsulate the substrate and decorative surface layer together with substrate resins. When the resins are catalyzed and cured, a structurally strong and decorative unit as an integral element, results. The process for making the components is particularly suited to a pultrusion process.

5 Claims, 1 Drawing Sheet

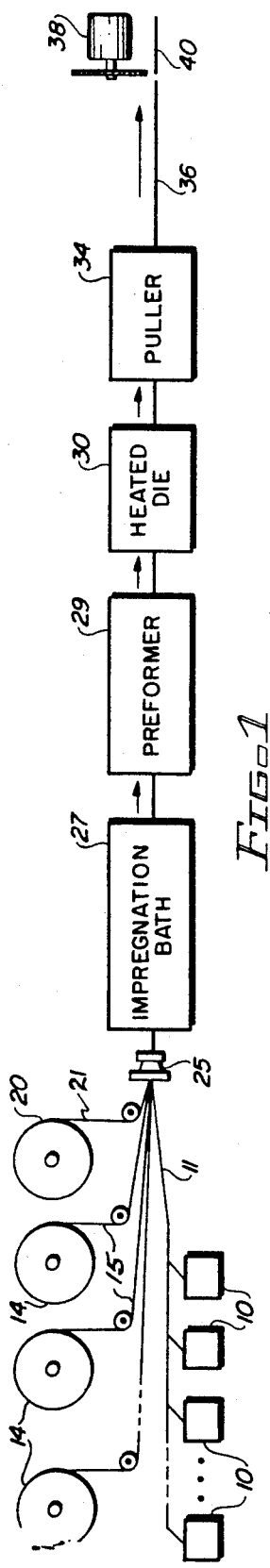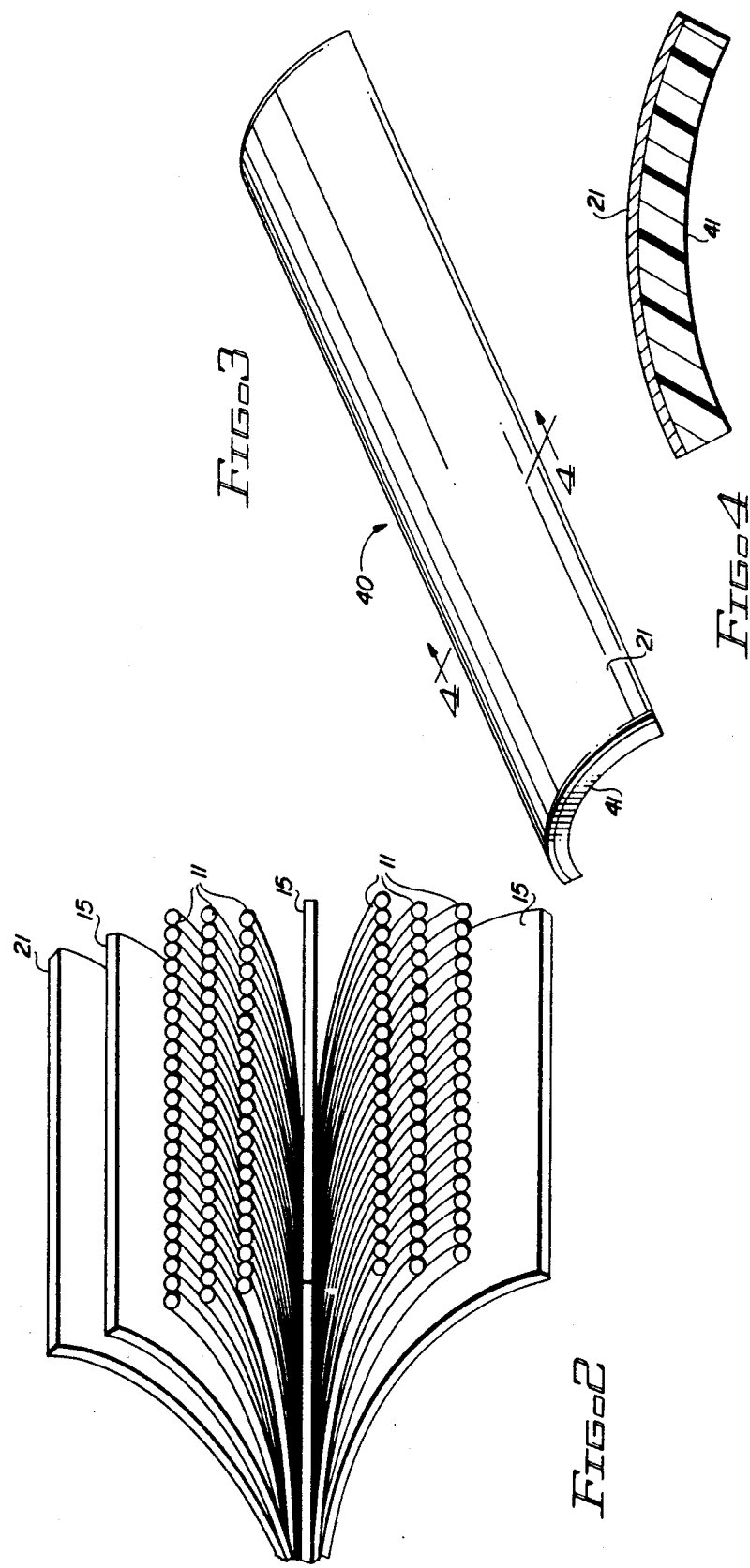

REINFORCING SUBSTRATE STRUCTURES WITH DECORATIVE SURFACE LAYER

BACKGROUND

Thin cover sheets, or veneers, made of a variety of materials, such as wood, metal, cloth, paper, and the like, long have been applied to various structural substrates for decorative purposes. Typical substrates are made of plastic, metal, wood, particle board, or other suitable materials. Generally, the decorative veneers are bonded to the underlying substrate through the use of various adhesives. When veneers made of relatively porous materials, such as cloth or paper, are used, care must be taken in the choice of the adhesives used to prevent unattractive bleed-through, or discolorations, resulting from the adhesive passing the veneer material.

Frequently, to ensure suitable bonding, it is necessary to employ thermo-setting adhesives which bond the decorative veneer to the underlying substrate through a combination of heat and pressure. Such processes are limited in the type and shapes of products which can be produced. Typically, high pressure applications are not suitable for the continuous formation of product.

Whenever adhesives are used to bond a decorative veneer or decorative surface film to an underlying substrate, de-lamination of the veneer or film from the substrate frequently takes place, after a period of time. This is a result of heat and moisture changes which produce different coefficients of expansion between the veneer and the underlying substrate, as well as changes which take place in the adhesive as it ages and as it is exposed to variations in heat and moisture.

The Kudo U.S. Pat. No. 3,960,639 discloses an approach for making a wood veneer covered metal substrate with improved bonding between the veneer and the substrate. In the Kudo patent, a non-woven cloth is impregnated with a thermo-plastic phenolic resin and then is placed between a flat metal facing sheet and flat sheet of veneer. Heat and pressure are applied to melt the adhesive and cause it to bond to both the substrate and the veneer surfaces. It is necessary, subsequently, to then stamp or otherwise shape the resultant product for its desired end use. The production of veneer covered metal substrates, in accordance with the Kudo process, is not suitable for a continuous operation.

Another patent directed to the utilization of a graphic print sheet on a rigid, flat panel is the patent to Goeden U.S. Pat. No. 4,746,560. The Goeden patent is directed to rigid fiberglass panels, which are impregnated with polyester resin, and which have an overlying resin-impregnated graphic print sheet on them. A transparent overlay layer placed over the printed sheet also is disclosed. The products of Goeden are used for flooring material, or for wallcoverings. Goeden requires the lamination to be formed by placing base mats in a press with the print and a cover sheet, or veil, placed on top of the print layer. The press then is closed at approximately 500 psi at 220° F. for several minutes. This clearly is not a continuous process, although the resultant product is a strong composite panel, with a decorative image on the exposed surface.

The patent to Kiss U.S. Pat. No. 4,655,861 discloses a continuous process for producing strips of products having a substrate which is bonded to a decorative surface. In Kiss, a protection sheet and a decorative sheet are moved past a station where the side of the decorative sheet not covered by the protective sheet is coated with an adhesive. A mixture of fibers and thermo-plastic binder is applied to the adhesive on the protective sheet. The sheet with the fibrous layer then is passed between calendar rolls to compress it. After this step, the product is cut to the desired shape and is finished in a heated compression mold, to form the sheet into an end product, and to soften the thermo-plastic binder in the designed for use as automobile panel coverings.

The patent to Barrell U.S. Pat. No. 4,803,022 is directed to a continuous process for producing metal foil laminates, used subsequently for manufacturing printed circuits. The metal foil is directly bonded to a sheet of fiberglass reinforced polyester and epoxy resin. To form the resultant laminate, a layer of polyester and epoxy resin is applied to copper foil. This layer also may contain an adhesion promoter. Chopped glass fibers are randomly distributed into the resin layer, and the laminate is subjected to heat treatment to initiate gelation. After gelation, the laminate is cured to bond the substrate thus formed to the metal foil. The curing step utilizes radio frequency electromagnetic energy to raise the temperature of the laminate for improving the bonding of the substrate to the copper foil. The final curing step is not part of the continuous process, but is accomplished in a batch process after desired lengths of the laminate are cut from the strip formed in the initial continuous stages of the process.

The patent to Prince, et al U.S. Pat. No. 4,818,590 is directed to a rigid plastic foam substrate which has a thin wood veneer adhesively bonded to the substrate to form a variety of decorative products, suitable for venetian blinds, furniture panels, room dividers, and the like. The patent is specifically limited to rigid polyvinyl chloride substrates, or comparable products, to which thin wood veneer panels are bonded by means of wood adhesives or heat lamination adhesives. The veneer is chosen to be very thin compared to the thickness of the substrate. The product which is disclosed in the Prince patent is similar in appearance, and is constructed in a similar manner, to the known metal/wood veneer products of the past. The physical characteristics of the underlying plastic, however, essentially are matched to those of the wood veneer, to avoid the problems of separation, cracking, and the like, which occurred with earlier metal/wood veneer laminated products.

Lineal structural fiberglass members made by pultrusion are disclosed in the patents to Hindersinn U.S. Pat. No. 4,419,400; Carter et al U.S. Pat. No. 4,681,722; and Thorsted U.S. Pat. No. 4,842,667. No decorative veneers are disclosed in these patents.

Although a variety of products are disclosed in the prior art, as typified by the patents mentioned above, where a decorative surface is applied to an underlying substrate, none of these prior art structures have a decorative surface which constitutes an integral part of the substrate itself. Accordingly, it is desirable to provide a process which creates a unitary structurally strong product in which a decorative surface layer is an integral part of an underlying supporting substrate.

SUMMARY OF THE INVENTION

Accordingly, it is an object of this invention to provide an improved decorative structural unit.

It is another object of this invention to provide a decorative structural unit in which a decorative surface layer is an integral part of a supporting substrate.

It is an additional object of this invention to provide an improved method of making a decorative structural unit.

In accordance with a preferred embodiment of this invention, a decorative structural element is formed by integrally bonding a decorative surface layer of suitable material to a reinforced substrate, made of reinforcement materials and a suitable resin, by simultaneously integrally bonding the substrate and the decorative surface layer together with the same resins used in making the substrate to produce the finished product in accordance with standard product forming techniques.

BRIEF DESCRIPTION OF THE DRAWING

FIG. 1 is a diagrammatic representation of the process used to form a preferred embodiment of the invention;

FIG. 2 is an enlarged diagrammatic representation of some of the elements used in the process of FIG. 1;

FIG. 3 is a perspective view of a typical product produced by the process of FIG. 1; and FIG. 4 is a cross-sectional view taken along the lines 4—4 of FIG. 3.

DETAILED DESCRIPTION

Reference now should be made to the drawing in which the same reference numbers are used in the various figures to designate the same components.

FIG. 1 is directed to a process for practicing the preferred embodiment of the invention to produce pultruded reinforcing substrate products or pre-impregnated advance composite products which have an integrally formed decorative surface layer in them. Pultrusion processes have been used for several years, to produce high strength, low weight, products. A variety of different shapes are produced by pultrusion processes to produce elongated products on a continuous basis. The resultant products are similar in many respects to aluminum extrusions, but require significantly less energy to produce and, in many applications, provide superior physical characteristics to those of extruded aluminum.

As illustrated in FIG. 1, a typical pultrusion process is utilized to draw large numbers of fiberglass rovings 11 or reinforcing substrates from supply reels 10 through a suitable guide 25, along with interspersed continuous strand mats 15, pulled from a suitable number of supply rollers 14. The manner in which the mats 15 and the rovings 11 are interspersed with one another, and arranged by the guides 25, is standard and well known. In a conventional pultrusion process, the amount and location of the rovings is established by the finished shape of the product, as are the amount and locations of the continuous strand mats 15. The rovings 11 provide the necessary tensile strength required to pull all of the other components through the die of the pultrusion apparatus. The continuous strand mats 15 are layered with the rovings 11, as diagrammatically illustrated in FIG. 2, and the ratio of the mats 15 to the rovings 11 establishes the transverse to longitudinal physical properties of the finished product.

In the standard pultrusion process, the rovings 11 and mats 15 are pulled from the guides 25 and are passed through a resin impregnation bath 27. Typical resins include polyester resins, combined with suitable fillers, catalysts, pigments and other desired materials, such as fire retardant compounds, and the like. Although polyester resins are most frequently used, phenolics, vinylester resins and other thermosetting or thermoplastic resins or epoxy resins may used if higher strength or corrosion resistance characteristics are important for the finished product. Irrespective of the type of resin used in the impregnation bath 27, the process is the same.

The rovings 11 and mats 15 are thoroughly impregnated with the resins, either by a pressure spraying apparatus or by immersion, to ensure intimate resin contact with all of the components. After passing through the impregnation bath 27, the resin wetted array of rovings and mats is pulled through, a preforming guide 29 to form a resin impregnated laminate or reinforcing substrates. This laminate then is pulled through a heated pultrusion die which produces the final form for the product. A continuous length of cured fiberglass laminate or advance composite laminate is discharged from the die to a puller 34 which continuously pulls the finished laminate from the die and continuously pulls additional rovings 11 and mats 15 from the reels 10 and 14, respectively, to produce the finished product 36 on a continuous basis. A cut off saw 38 cuts the product into desired lengths 40 for subsequent distribution and use.

To this point, the pultrusion process which has been described in conjunction with FIG. 1, is a known process and may use a variety of different resins, catalysts, percentages of reinforcing substrate materials, and the like, to produce the desired end product characteristics. Such a product, however, while it is structurally strong and holds a permanent form, is not decorative. For some applications, suitable dyes are mixed with the resins in the impregnation bath, but even so, the resultant end product merely has a single, uniform color throughout.

A significant modification to the otherwise standard pultrusion process shown in FIG. 1 is effected by supplying thin, flexible, continuous decorative veneer material 21 from a roller 20 over the top of the uppermost mat 15, or layer of rovings 11, of the reinforcing substrate materials supplied to the guides 25. The material 21 on the supply roller 20 is a thin layer of material, such as cloth, fabric, paper, thin wood veneers, photofinishes or the like. Typically, these materials are relatively porous, although for some applications thin decorative layers of non-porous materials, such as metals, or the like, may be used. Veneer material, such as the material 21, also can be applied over the bottom mat 15, or over both the top and bottom mats, if desired.

This thin, decorative surface layer 21 is applied through the guides 25 simultaneously with the application of the rovings 11 and the mats 15, to the impregnation bath 27. The layer 21 is impregnated simultaneously with the other layers of rovings 11 and mats 15, and occupies the position illustrated in FIG. 2, on top of the other materials fed through the guides 25 to the impregnation bath 27. The resins in the impregnation bath thoroughly coat and impregnate the thin decorative layer, or veneer, layer 21, simultaneously with the impregnation of the reinforcing substrate rovings 11 and mats 15. The thoroughly wetted combination of the rovings, mats and decorative surface layer 21 are supplied through the standard pultrusion preformer 29 and a standard pultrusion die 30 to produce the finished product 40.

A typical finished product 40 is illustrated in FIG. 3 as a vertical blind component, or the like, having a slightly curved cross-sectional configuration. The product 40 essentially consists of a pultruded fiberglass product with a thin decorative surface layer 21 integrally formed and intimately bonded or impregnated as a structural element of a substrate 41. As discussed previously, the decorative surface layer 21 may be a paper strip printed with a desired pattern, it may be cloth, it may be wood veneer or any other suitable material. It is important to note, however, that the layer 21 is not adhesively bonded to the substrate 41, but instead is an integral structural part of the completed product 40. This is the result of supplying the decorative surface layer 21 through the guide 25 to the impregnation bath, 27 simultaneously with all of the other elements of the reinforcing substrate pultrusion structure.

The structure 40 shown in FIG. 3 also can be obtained from a low-pressure, or high pressure reinforcing substrate construction other than a pultrusion, process, where the various layers of resin impregnated reinforcing substrate mats are built up in a mold. To accomplish this, the decorative surface layer 21, or veneer, is thoroughly impregnated, along with the reinforcing substrate components, with the same resin compounds used to complete the decorative structure.

The structural units 40 which are produced by the process described above differ from prior art structures where veneers, or thin decorative surfaces, are adhesively bonded to an underlying substrate. The structures 40 are such that the decorative layer is a permanent part of the underlying structure, so that subsequent separation of the decorative layer from the substrate cannot take place. Because a variety of different materials may be used for the decorative surface layer 21, many different patterns, colors, forms, textures, shapes and finish surfaces can be obtained to satisfy a particular application.

Although continuous strand matting 15 has been described in conjunction with the process illustrated in FIG. 1, it should be noted that if the physical properties of the end product 40 are not satisfied by conventional mat/roving construction, selected woven products, veils and other materials may be used. Various types of glass may be used. Similarly, standard reinforcing materials, such as graphite and aramid fibers also may be included or used in place of glass if the structural characteristics of these products are necessary to the finished product. These and other structural fibers are included in the definition of the term reinforcing substrate as used herein. Irrespective of the structure of the underlying reinforcing substrate, the decorative surface layer 21 is applied in the same manner to produce the desired pleasing aesthetic appearance to the surface of the finished product 40. If desired, an additional surface finish can be applied over the exposed surface of the decorative layer 21 to produce a hard surface for use of the product 40 in thresholds or other high wear applications.

The thickness of the completed products 40, produced in accordance with the above described method, extends over a relatively wide range, from a fraction of an inch to over two inches thick. The products which can be produced are limited only by the imagination of the end user. Typical products include blinds, shutters, vertical blinds, valances, thresholds, all types of moldings, door jambs, picture frames, pipe coverings, beam coverings, and the like. These are mentioned as illustrative, and by no means limit the applications which can be used. The decorative layer 21 typically has a thickness of 0.007 inches to 0.5 inches. The limitations on the thickness of the decorative surface layer 21, however, essentially are that it must be flexible enough to conform to the surface of the underlying substrate and be capable of wetting or impregnation to a sufficient extent that it intimately bonds to, and becomes part of, the finished structure with the substrate 41.

The foregoing description of the preferred embodiment of the invention should be considered as illustrative, and not as limiting. For example, a wide variety of pultruded product compositions can be used to form the underlying substrate 41, depending upon the strength and wear characteristics desired in the finished product. Although specific types of decorative layer materials and dimensional characteristics have been illustrated, the materials and characteristics can be varied by those skilled in the art, to produce the simultaneous integral formation of the structural parts disclosed. Various other changes and modifications will occur to those skilled in the art without departing from the true scope of the invention as set forth in the appended claims.

I claim:

1. A decorative structural element, including in combination:
   a reinforcing substrate made of reinforcement materials and resin, and having a surface; and
   a decorative veneer surface layer, having a thickness which is not greater than the thickness of said substrate, on the surface of said substrate and integrally bonded to said substrate by the same resin used in making the substrate simultaneously with the forming of the shape of said substrate, said decorative surface layer being made of a member selected from the group consisting of fabric, paper or wood and having sufficient porosity to permit penetration thereof by said resin used in making said substrate.

2. The combination according to claim 1 wherein said resin is a thermosetting resin selected from the group consisting of phenolics, polyesters, vinylesters, epoxies, or clear laminating resins.

3. The combination according to claim 2 wherein the substrate further is in the form of rovings or a member selected from the group consisting of continuous strand filament, or woven or non-woven matting.

4. The combination according to claim 1 wherein said substrate further is in the form of rovings or a member selected from the group consisting of continuous strand filament, or matting.

5. The combination according to claim 1 wherein said structural element is formed by pultrusion.

* * * * *